US008027300B2

(12) United States Patent
Zelst et al.

(10) Patent No.: US 8,027,300 B2
(45) Date of Patent: Sep. 27, 2011

(54) VCO RINGING CORRECTION IN PACKET SWITCHED WIRELESS NETWORKS

(75) Inventors: Albert Van Zelst, Woerden (NL); Didier J. Richard Van Nee, De Meern (NL); Vincent Knowles Jones, IV, Redwood City, CA (US); Tracy Hall, Chandler, AZ (US)

(73) Assignee: Qualcomm Incorporated, San Diego, CA (US)

( * ) Notice: Subject to any disclaimer, the term of this patent is extended or adjusted under 35 U.S.C. 154(b) by 1016 days.

(21) Appl. No.: 11/872,365

(22) Filed: Oct. 15, 2007

(65) Prior Publication Data

US 2008/0089450 A1   Apr. 17, 2008

Related U.S. Application Data

(60) Provisional application No. 60/829,857, filed on Oct. 17, 2006.

(51) Int. Cl.
*H04L 1/00* (2006.01)

(52) U.S. Cl. ........ 370/330; 370/208; 370/343; 370/344; 375/354

(58) Field of Classification Search .......... 370/206, 370/330, 473, 208, 343, 344; 331/17; 375/325–327, 375/344, 371, 373–376, 354; 455/255, 257, 455/260, 264
See application file for complete search history.

(56) References Cited

U.S. PATENT DOCUMENTS

| | | | | |
|---|---|---|---|---|
| 5,668,828 A * | 9/1997 | Sanderford et al. | .......... | 375/136 |
| 6,091,932 A | 7/2000 | Langlais | | |
| 6,650,187 B1 * | 11/2003 | Riddle et al. | ..................... | 331/17 |
| 6,839,381 B1 * | 1/2005 | Sheng et al. | .................. | 375/150 |
| 7,058,369 B1 | 6/2006 | Wright et al. | | |
| 7,457,314 B2 * | 11/2008 | Heitmann | ...................... | 370/473 |
| 2002/0176519 A1 * | 11/2002 | Chiodini et al. | ............... | 375/324 |
| 2004/0081074 A1 * | 4/2004 | Piechocki | ...................... | 370/206 |
| 2005/0169357 A1 * | 8/2005 | Sedarat | ......................... | 375/222 |
| 2005/0220209 A1 * | 10/2005 | Lewis | ............................ | 375/267 |
| 2005/0276347 A1 | 12/2005 | Mujtaba et al. | | |
| 2006/0092892 A1 | 5/2006 | Trachewsky | | |
| 2007/0097911 A1 * | 5/2007 | Ouyang et al. | .................. | 370/329 |
| 2007/0147284 A1 * | 6/2007 | Sammour et al. | ............. | 370/328 |

OTHER PUBLICATIONS

International Search Report dated May 1, 2008 for PCT Application Serial No. PCT/US 07/81528, 2 Pages.

* cited by examiner

*Primary Examiner* — Hassan Kizou
*Assistant Examiner* — Toan Nguyen
(74) *Attorney, Agent, or Firm* — Turocy & Watson, LLP

(57) ABSTRACT

Systems and methodologies are described that facilitate mitigating ringing effects of a voltage-controlled oscillator upon turning on a transmitter. A receiver generates at least one frequency offset estimate subsequent to an antecedent frequency offset estimate that is potentially erroneous due to ringing effects. The receiver extrapolates a phase error on upcoming symbols based upon a delta between the subsequent and antecedent frequency offset estimates. The phase error is employed to correct the upcoming symbol for ringing effects. In addition, the transmitter can detect a packet in advance of being ready for transmission and power up upon detection to allow the ringing to settle.

23 Claims, 12 Drawing Sheets

VCO RINGING CORRECTION IN PACKET SWITCHED WIRELESS NETWORKS

CROSS-REFERENCE TO RELATED APPLICATIONS

This application claims the benefit of U.S. Provisional Patent application Ser. No. 60/829,857 entitled "VCO RINGING CORRECTION IN PACKET SWITCHED WIRELESS NETWORKS" which was filed Oct. 17, 2006. The entirety of the aforementioned application is herein incorporated by reference.

BACKGROUND

I. Field

The following description relates generally to wireless communications, and more particularly to voltage-controlled oscillator ringing correction.

II. Background

Wireless networking systems have become a prevalent means by which a majority of people worldwide has come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service, expanded areas of coverage and increased functionality.

Generally, a wireless multiple-access communication system may simultaneously support communication for multiple wireless terminals or user devices. Each terminal communicates with one or more access points via transmissions on the forward and reverse links. The forward link (or downlink) refers to the communication link from the access points to the terminals, and the reverse link (or uplink) refers to the communication link from the terminals to the access points.

Wireless systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. In addition, wireless systems may be capable of supporting communication in a multiple-input multiple-output (MIMO) channels to, e.g., enhance the throughput by space division multiplexing (SDM) and/or enhance the robustness by space-time coding (STC).

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method that accounts for voltage-controlled oscillator ringing effects is described herein. The method can comprise generating at least one frequency offset estimate on received symbols that is subsequent to an antecedent frequency offset estimate on received symbols. In addition, the method can include extrapolating a phase error in a symbol based at least upon a difference between the subsequent at least one frequency offset estimate and the antecedent frequency offset estimate. The method can also comprise correcting the phase error for the symbol.

Another aspect relates to a wireless relates to a wireless communications apparatus that can comprise a memory that retains instructions related to generating at least one frequency offset estimate on received symbols that is subsequent to an antecedent frequency offset estimate on received symbols, extrapolating a phase error in a symbol based at least upon a difference between the subsequent at least one frequency offset estimate and the antecedent frequency offset estimate and correcting the phase error for the symbol. The wireless communications apparatus can also include a processor coupled to the memory, configured to execute the instructions retained in the memory.

Yet another aspect relates to a wireless communications apparatus that facilitates mitigating ringing effects. The apparatus can include means for generating at least one frequency offset estimate on received symbols that is subsequent to an antecedent frequency offset estimate on received symbols. In addition, the apparatus can include means for extrapolating a phase error in a symbol based at least upon a difference between of the subsequent at least one frequency offset estimate and the antecedent frequency offset estimate. The apparatus can further comprise means for correcting the phase error for the symbol.

Still another aspect relates to a machine-readable medium having stored thereon machine-executable instructions for generating at least one frequency offset estimate on received symbols that is subsequent to an antecedent frequency offset estimate on received symbols. The machine-readable medium can further comprise instructions for extrapolating a phase error in a symbol based at least upon a difference between the subsequent at least one frequency offset estimate and the antecedent frequency offset estimate. In addition, the machine-readable medium can include instructions for correcting the phase error for the symbol.

According to another aspect, in a wireless communications system, an apparatus can comprise an integrated circuit. The integrated circuit can be configured to generate at least one frequency offset estimate on received symbols that is subsequent to an antecedent frequency offset estimate on received symbols. The integrated circuit can further be configured to extrapolate a phase error in a symbol based at least upon a difference between the subsequent at least one frequency offset estimate and the antecedent frequency offset estimate and to correct the phase error for the symbol.

According to yet another aspect, a method that facilitates mitigating ringing effects in a transmitter is described herein. The method can comprise detecting when a packet is scheduled for transmission. In addition, the method can include powering on at least a portion of the transmitter upon detection of the scheduled packet.

Another aspect described herein relates to a wireless communications apparatus that can include a memory that retains instructions related to detecting when a packet is scheduled for transmission and powering on at least a portion of the transmitter upon detection of the scheduled packet. In addition, the wireless communications apparatus can comprise an integrated circuit coupled to the memory, configured to execute the instructions retained in the memory.

Yet another aspect relates to a wireless communications apparatus that mitigates ringing effects in a transmitter. The apparatus can comprise means for detecting when a packet is scheduled for transmission. In addition, the apparatus can include means for powering on at least a portion of the transmitter upon detection of the scheduled packet.

Still another aspect relates to a machine-readable medium having stored thereon machine-executable instructions for detecting when a packet is scheduled for transmission. The machine-readable medium can further comprise instructions for powering on at least a portion of the transmitter upon detection of the scheduled packet.

A further aspect described herein relates to an apparatus in a wireless communications system that can comprise an integrated circuit. The integrated circuit can be configured to detect when a packet is scheduled for transmission. In addition, the integrated circuit can be configured to power on at least a portion of the transmitter upon detection of the scheduled packet.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
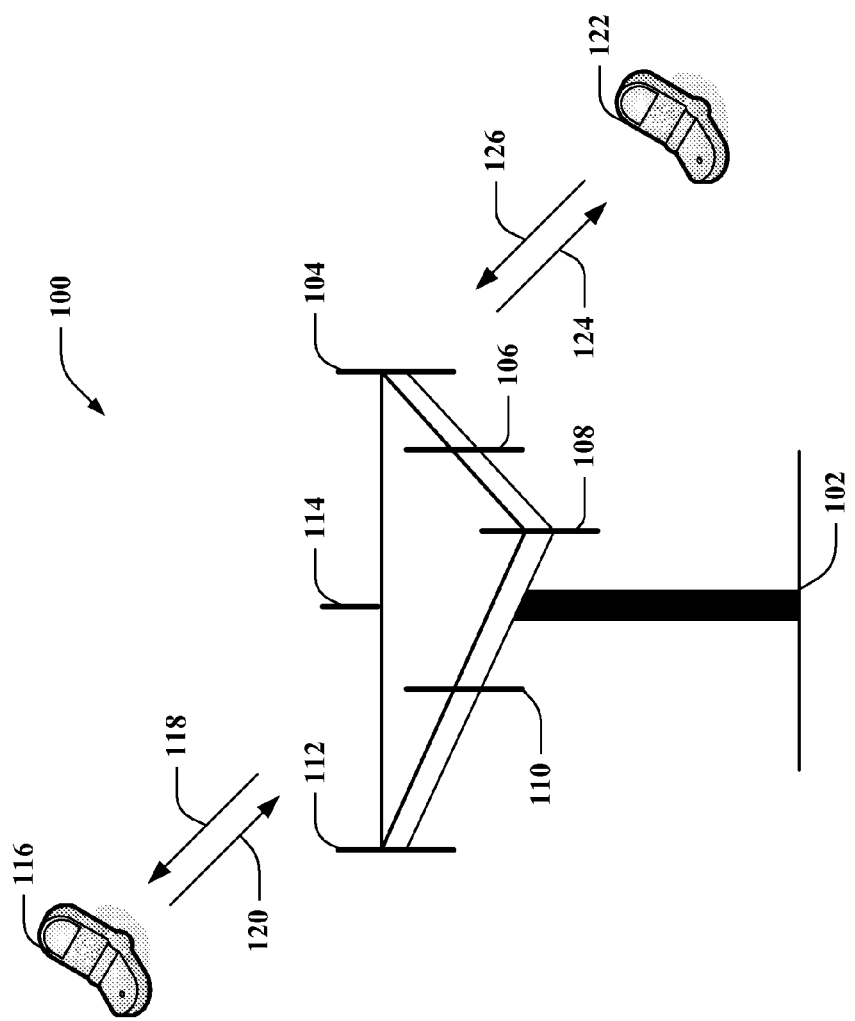
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additionally include a transmitter chain and a receiver chain or multiple transmitter chains and receiver chains, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. Mobile devices 116 and 122 can have a transmitter chain and a receiver chain or multiple transmitter chains and receiver chains, each of which can in turn comprise a plurality of components associated with signal transmission and reception (e.g., processors, modulators, multiplexers, demodulators, demultiplexers, antennas, etc.), as will be appreciated by one skilled in the art.

As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

The set of antennas and/or the area in which they are designated to communicate may be referred to as a sector of base station 102. For example, multiple antennas may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

Figure 2:
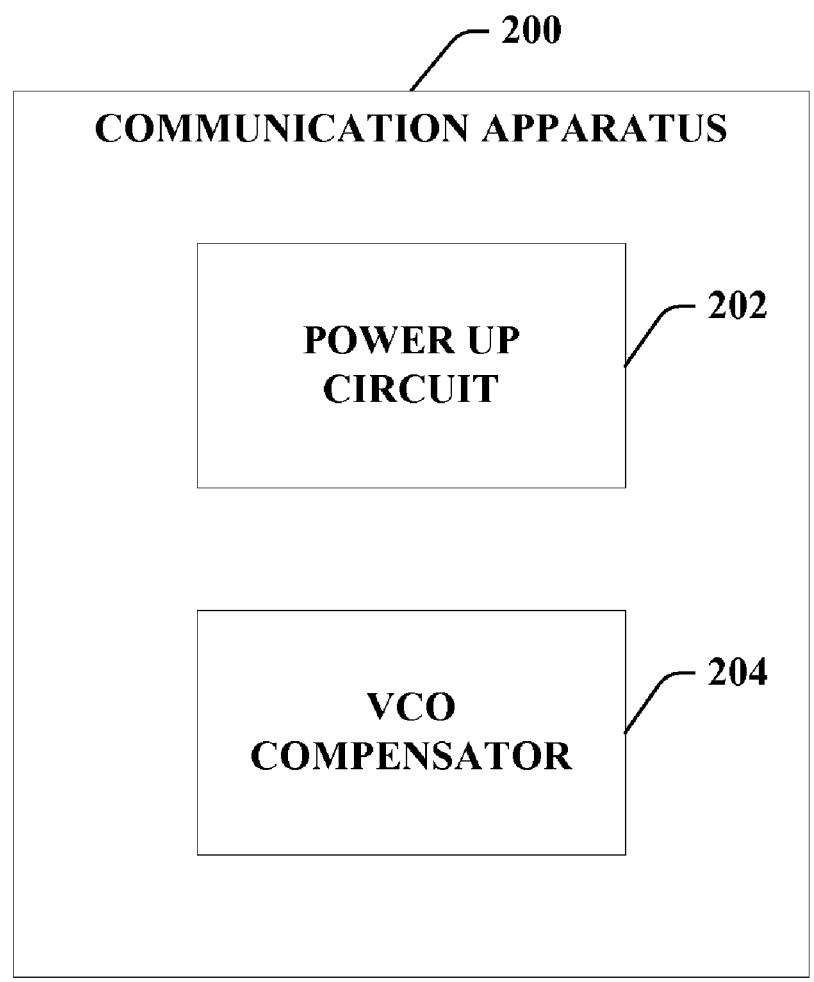
FIG. 2 is an illustration of an example communications apparatus for employment in a wireless communications system according to an aspect of the subject disclosure.

Turning now to FIG. 2, illustrated is a communications apparatus 200 for employment within a wireless communications environment. For example, communications apparatus 200 may be utilized in a packet-switched wireless network. Communications apparatus 200 may be a base station or a portion thereof or a mobile device or a portion thereof. Communications apparatus 200 may include a power up circuit 202 that facilitates turning on a transmitter (not shown) in anticipation of a packet transmission. Conventionally, in packet-switched wireless networks, a large portion of the transmitter may be turned off or in a power-save mode to conserve power in periods where no packets are transmitted. When the portions of the transmitters are turned on before a packet is transmitted, a large current may be drawn from a power source. The large current drawn may result in a voltage drop on the power bus which may cause a change in the output of some portions of the transmitter. For example, the voltage-controlled oscillator (VCO) employed to generate a carrier frequency may be affected by the current draw. The VCO output may initially change and try settle to a prescribed frequency as the transmitter circuits stabilize. A VCO ringing effect with a certain settling time results.

Power up circuit 202 may mitigate the VCO ringing effect. Power up circuit 202 may turn on portions of the transmitter as soon as a packet is scheduled to be transmitted. Power up circuit 202 may power on the transmitter ahead of time while the packets are still be processed for transmission. For example, power up circuit 202 can turn on the transmitter while the physical (PHY) layer and/or the media access control (MAC) layer process the packet. As some time is required for the PHY and MAC layers process the packet, the VCO ringing may settle before transmission of the packet over the air commences.

Communications apparatus 200 may further include a VCO compensator 204 employable to correct ringing effects of the VCO on a carrier frequency. VCO compensator 204 may utilize estimates of the VCO ringing effect per transmit configuration. Transmit configuration may include a single transmit antenna, space-time spreading, selective transmit diversity, MIMO and the like. The transmit configuration may determine which portion or portions of the transmitter need to be turned on for transmission. Accordingly, each transmit configuration may generate a different initial current draw resulting in varying voltage drops. Thus, the VCO ringing effect may take various forms depending on the particular transmit configuration employed. VCO compensator 204 may utilize the appropriate estimate to digitally compensate for the ringing effect on the VCO output to produce a more stable carrier frequency.

Moreover, although not shown, it is to be appreciated that communications apparatus 200 may include memory that retains instructions with respect to determining when a packet is scheduled for transmission, powering up a transmitter prior to transmission and while a packet is processing on lower layers, modeling VCO ringing, compensating for ringing in the VCO output, and the like. Further, communications apparatus 200 may include a processor that may be utilized in connection with executing instructions (e.g., instructions retained within memory, instructions obtained from a disparate source, . . . ).

Figure 3:
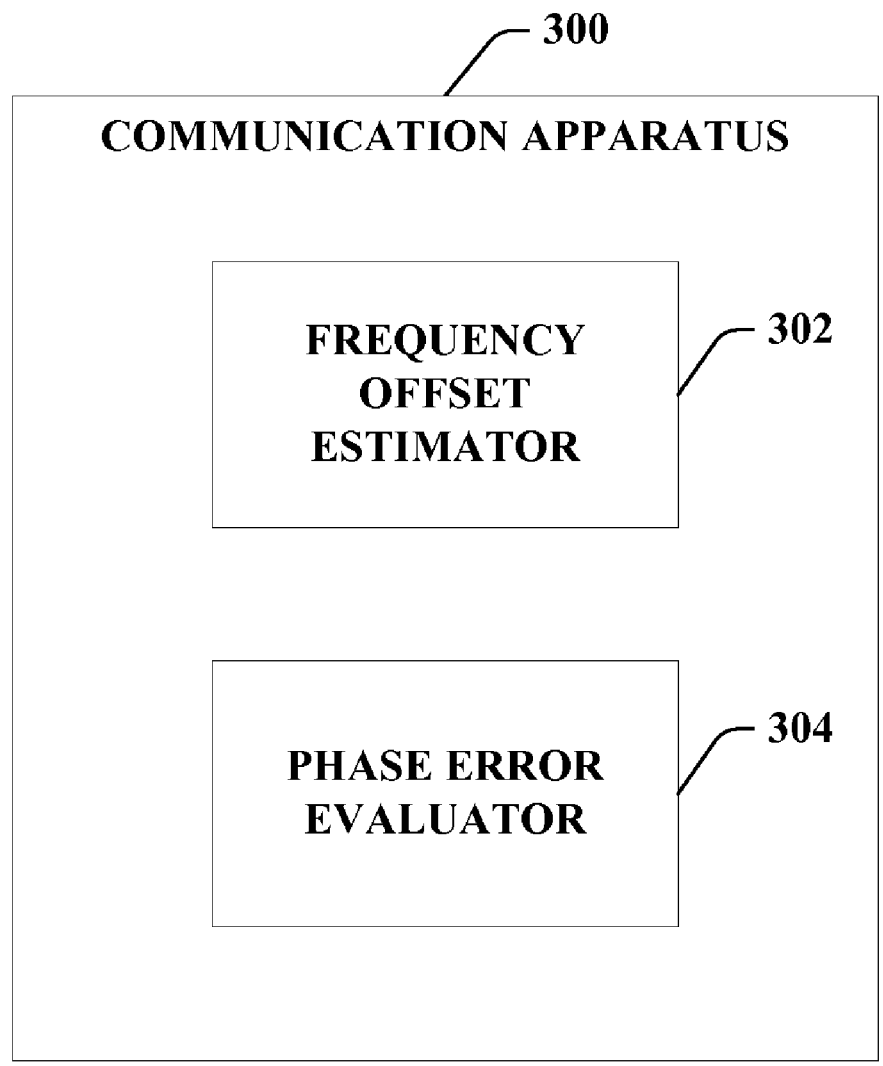
FIG. 3 is an illustration an example communications apparatus for employment in a wireless communications system according to an aspect of the subject disclosure.

Turning now to FIG. 3, a communications apparatus 300 is illustrated. Communications apparatus 300 may be employed within a wireless communications environment. According to one aspect, communications apparatus 300 may be utilized in a packet-switched wireless network. Communications apparatus 300 may be a base station or a portion thereof or a mobile device or a portion thereof. Communications apparatus 300 may include a frequency offset estimator 302 that effectuates estimating a frequency offset between transmitter and receiver. In particular, frequency offset estimator 302 evaluates a delta or difference between two frequency offset estimates to mitigate estimation error.

The VCO ringing effect may introduce frequency offset estimation error when the carrier frequency affected by the ringing effect is not settled at the time the estimate is performed. If the erroneous estimate is employed to correct subsequent orthogonal frequency division multiplexed (OFDM) symbols, an incremental phase error can be introduced. The phase error can influence the accuracy of a channel estimate that utilizes the later OFDM symbols.

Typically, uncorrected VCO ringing effects may result in reduced performance of communications apparatus 300. By way of illustration, consider an example of a preamble employing a Greed Field packet format. The Green Field format may be used for transmission between MIMO-OFDM systems in the presence of legacy systems. However, Green Field packet format include high-throughput (HT) symbols and does not incorporated legacy symbols. The Green Field preamble comprises ten short training fields (HT-STFs) that can be employed for packet detection. The HT-STFs can also be utilized for acquisition and time synchronization purposes. The preamble can further comprise two long training fields (HT-LTFs) for single-input, multiple output (SIMO) channel estimation. In addition, the Green Field preamble can include two signal fields (i.e., HT-SIG1 and HT-SIG2) that carry information utilized to demodulate the data payload. The Green Field preamble can further comprise a third HT-LTF. The third HT-LTF can be employed along with the first two HT-LTFs to perform MIMO channel estimation.

In accordance with one aspect, the first two long training fields can be utilized to estimate a frequency offset between transmitter and receiver. For example, an average can be computed over a phase delta between corresponding samples of the two symbols. A frequency offset estimation error is introduced if a carrier frequency that includes a VCO ringing effect does not settle at the time of estimation. A phase error is introduced on subsequent OFDM symbols if the erroneous estimate is employed. A phase error on the third long training field can directly influence the accuracy of the MIMO channel estimate.

For example, VCO ringing can introduce an additional frequency offset of about 3 KHz. Accordingly, any correction to OFDM based upon that frequency offset introduces an error of 3 KHz. The phase delta due to the additional frequency offset between the first two long training fields and the third long training field is about $2\pi(3000)(14e^{-6})$ as the time between the time averages of the first two HT-LTFs and the third HT-LTF is about 14 microseconds in MIMO Green Field. If the phase of the first two long training fields and the third long training field are averaged in a MIMO channel estimate, an effective phase error of about half the phase delta results. As a result, an error vector magnitude of about −17.4 dB can occur. This error can cause significant inaccuracies in the channel estimate which limits the effective capacity and data rate of the MIMO system. In addition, the frequency offset estimation error also causes error in timing-drift correction. Timing-drift correction error can also cause MIMO channel estimation error.

Frequency offset estimator 302 performs at least one subsequent frequency offset estimates to account for VCO ringing. For ease of explanation, examples are provided below relating to the Green Field preamble described supra. It should be appreciated that aspects of the subject disclosure can be applied to that other preamble and/or packet formats including formats with small preambles or no preambles. For example, aspects of the subject disclosure can be applied to a mixed format packet of 802.11n protocol or a legacy 802.11a packet.

The delta or difference between the frequency offsets can be employed to estimate a phase error on future symbols by extrapolating the phase error forward. For example, a transmitter employing a Green Field preamble can experience VCO ringing that is not settled on the first two long training fields. The errors described above can be introduced if a frequency offset estimate is performed on the long training fields. However, the ringing settles on the first or second signal fields. Thus, the first or second signal fields (i.e., HT-SIG1 and/or HT-SIG2) can be employed by frequency offset estimator 302 to perform a second frequency offset estimate.

By way of example, in a system employing the Greenfield format, the second estimate is on HT-SIG2 while the estimate is on HT-SIG1 is a system utilizing mixed format packets. Additionally, a second frequency offset can be employed on a data field when legacy formats are utilized. The delta or difference between the first frequency offset estimate performed on the long training fields and the second frequency offset estimate on the signal fields can be utilized to determine a phase error between the first two long training fields and the third training field that typically follows the signal fields. The phase error can be determined based on an extrapolation of the phase error per sample which is linearly related to the delta between the frequency offset estimates. A MIMO channel estimate can be improved by first correcting for the evaluated phase error prior to conducting the channel estimation.

Frequency offset estimator 302 can utilize various mechanisms to estimate frequency offsets. In one aspect, the symbols after the first two long training field can be corrected utilizing the frequency offset estimate performed on the first two long training fields. This correction occurs before the symbols are demodulated and decoded. While the first estimate can be erroneous due to VCO ringing, correcting the signal fields with this estimate before performing a second frequency offset estimate on the signal fields enables the second estimate to directly represent the frequency offset delta.

According to one aspect, frequency offset estimator 302 can collect frequency offset estimate via estimation of the phase of pilot tones of communications apparatus 300. The phase of the pilots tones can be approximately equivalent to a phase offset related to a SIMO channel estimate (obtained from the first two long training fields) employed to demodulate the signal fields. For example, the time between the middle of the fast fourier transform (FFT) window of the signal field and the middle of the first two long training fields can be 192 samples at a 20 MHz sampling rate. Thus, the delta frequency offset estimate can be evaluated based upon the quotient of the average phase of the pilot tones and the number of samples. In addition to utilizing pilot tones, frequency offset estimator 302 can employ blind techniques. Frequency offset estimator 302 can employ data subcarriers or a portion thereof in the signal field where the VCO ringing has settled (e.g., HT-SIG2) to estimate a phase offset of the signal field with respect to the SIMO channel estimate. The residual frequency offset estimate (i.e., the delta frequency offset estimate) is obtained by dividing the phase offset by the time between when the channel estimate is performed and the signal field. It is to be appreciated that frequency offset estimator 302 can employ either of the aforementioned mechanism or a combination thereof.

Communications apparatus 300 further includes a phase error evaluator 304 that utilizes the frequency offset estimates to evaluate a phase error. The phase error can be the error on the third long training field which is employed in a MIMO channel estimation. Phase error evaluator 304 can multiply the delta frequency offset estimate with a time period between the SIMO channel estimate and the beginning of the third long training field. The resultant extrapolated phase is the phase offset at the beginning of the third long training field. This extrapolated value together with the second frequency offset estimate and/or the delta frequency offset estimate can be utilized to correct the phase error per sample of the third long training field. The correction can occur prior to a MIMO channel estimation to improve the accuracy of the channel estimate.

Frequency offset estimator 302 can perform additional frequency offset measurements. For example, frequency offset estimator 302 can perform a measurement on the first signal field, HT-SIG1. In general, multiple frequency offset or phase offset measurements can help to better extrapolate a phase error on a third long training field provided the measurements are reliable. In addition, curve fitting techniques can be utilized to model the course of the VCO ringing and obtain the extrapolated phase error. Frequency offset estimator 302 can make multiple measurements of frequency offset between any two OFDM symbols. For example, a sequence of frequency offset estimates can be made. These estimates can be made every 4 microseconds for 802.11 or other similar protocols. It is to be appreciated that other protocols or sampling rates can be employed with the subject innovation. The measurements can be utilized to determine the amplitude and decay of VCO ringing based on a model similar to that described below. In addition, Kalman filtering or other such estimation technique can be employed along with phase estimates to produce a filtered model of the VCO ringing for every OFDM symbol.

The VCO ringing may be modeled as a second order damped oscillator. In some cases, a damped frequency may be known. For example, the damped frequency may be identified when characteristics of a phase-locked loop (PLL) are known in advanced. When the damped frequency is a known quantity, phase error, ψ(k), can be modeled as follows:

$$\psi(k) = \alpha h(k)$$

Pursuant to this illustration, α, is a scalar value representing the amount of voltage causing the VCO ringing and h(k), is an impulse response of the VCO ringing model. As measurements are made by frequency offset estimator 302, a least squares estimate can be made for α can be made as follows:

$$\hat{\alpha} = \frac{\sum \psi(k)h(k)}{\sum h(k)^2}$$

Then, a filtered estimate for the phase error can be evaluated as follows:

$$\hat{\psi}(k) = \hat{\alpha} h(k)$$

Thus, a model of the phase error can be a function of the input voltage and the impulse response wherein the input voltage can be estimated by a least-squares technique.

According to another example, the damping coefficient and natural frequency of the PLL may not be known a priori. A second order model of the VCO ringing can be described with four unknowns (a, b, c, d) with the phase error as follows:

$$\psi(k) = a\psi(k-1) + b\psi(k-2) + cu(k-1) + du(k-2)$$

Pursuant to this illustration, u(0)=1 and u(k>0)=0. In addition, this model can be depicted in matrix form as shown below:

$$\begin{bmatrix} \psi(1) \\ \psi(2) \\ \psi(3) \\ \psi(4) \end{bmatrix} = \begin{bmatrix} \psi(0) & 0 & 1 & 0 \\ \psi(1) & \psi(0) & 0 & 1 \\ \psi(2) & \psi(1) & 0 & 0 \\ \psi(3) & \psi(2) & 0 & 0 \end{bmatrix} \begin{bmatrix} a \\ b \\ c \\ d \end{bmatrix}$$

The parameters a, b, c, and d can be estimated utilizing a variety of techniques (e.g., least squares) once at least four estimates of the phase error and an initial condition are determined. The estimated values for the parameters a through d can be employed to predict the phase error for future OFDM bursts and/or employed to produce a filtered (i.e., more accurate) estimate of phase error.

In addition to the models of phase errors described above, communications apparatus 300 can utilize a model of frequency offset due to VCO ringing. A second-order model of the frequency offset due to ringing as a function of time can be represented with the following:

$$f_{offset} = (f_1 - f_2)e^{-(\zeta \omega_n t)} \left( \cos\left(\omega_n \sqrt{1-\zeta^2} t\right) + \frac{(\zeta - R_2 C_2 \omega_n)}{\sqrt{1-\zeta^2}} \sin\left(\omega_n \sqrt{1-\zeta^2} t\right) \right)$$

Figure 4:
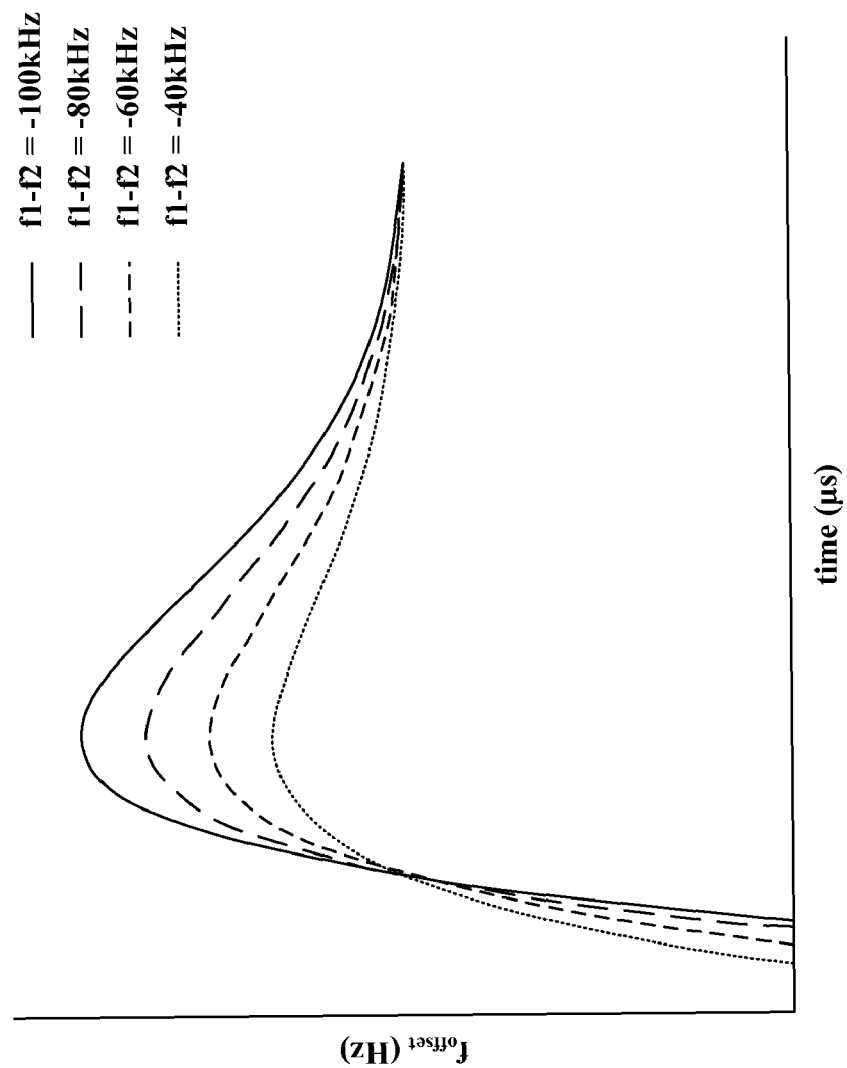
FIG. 4 is an illustration of exemplary VCO ringing a system may experience.

Pursuant to this illustration, $f_2$ is the final frequency in Hertz (Hz) and $f_1$, also in units of Hz, is the final frequency plus the initial frequency offset (i.e., the frequency pull). In addition, ζ is a damping coefficient and $\omega_n$ represents a natural frequency expressed in radians per second. $R_2$ and $C_2$ are model constants that represent a resistor and capacitor respectively. FIG. 4, illustrates frequency offset due to VCO ringing as a function of time for various values of initial frequency offsets ($f_1-f_2$). In FIG. 4, ζ=0.839, $\omega_n$=4.173×10$^5$ rad/s, $R_2$=1.867× 10$^3$Ω and $C_2$=2.152×10$^{-9}$ Farad. The peaks of the curves, from highest to lowest correspond to offsets ($f_1-f_2$) of −100 kHz, −80 kHz, −60 kHz and −40 kHz, respectively.

Moreover, although not shown, it is to be appreciated that communications apparatus 300 may include memory that retains instructions with respect to estimate frequency offsets with respect to packet symbols, determine a frequency offset estimate delta that indicates the effect of VCO ringing on the frequency offset estimates, evaluate a phase error on OFDM symbols, correct for the phase error, perform SIMO and MIMO channel estimates and the like. Further, communications apparatus 300 may include a processor that may be utilized in connection with executing instructions (e.g., instructions retained within memory, instructions obtained from a disparate source, . . . ).

Figure 5:
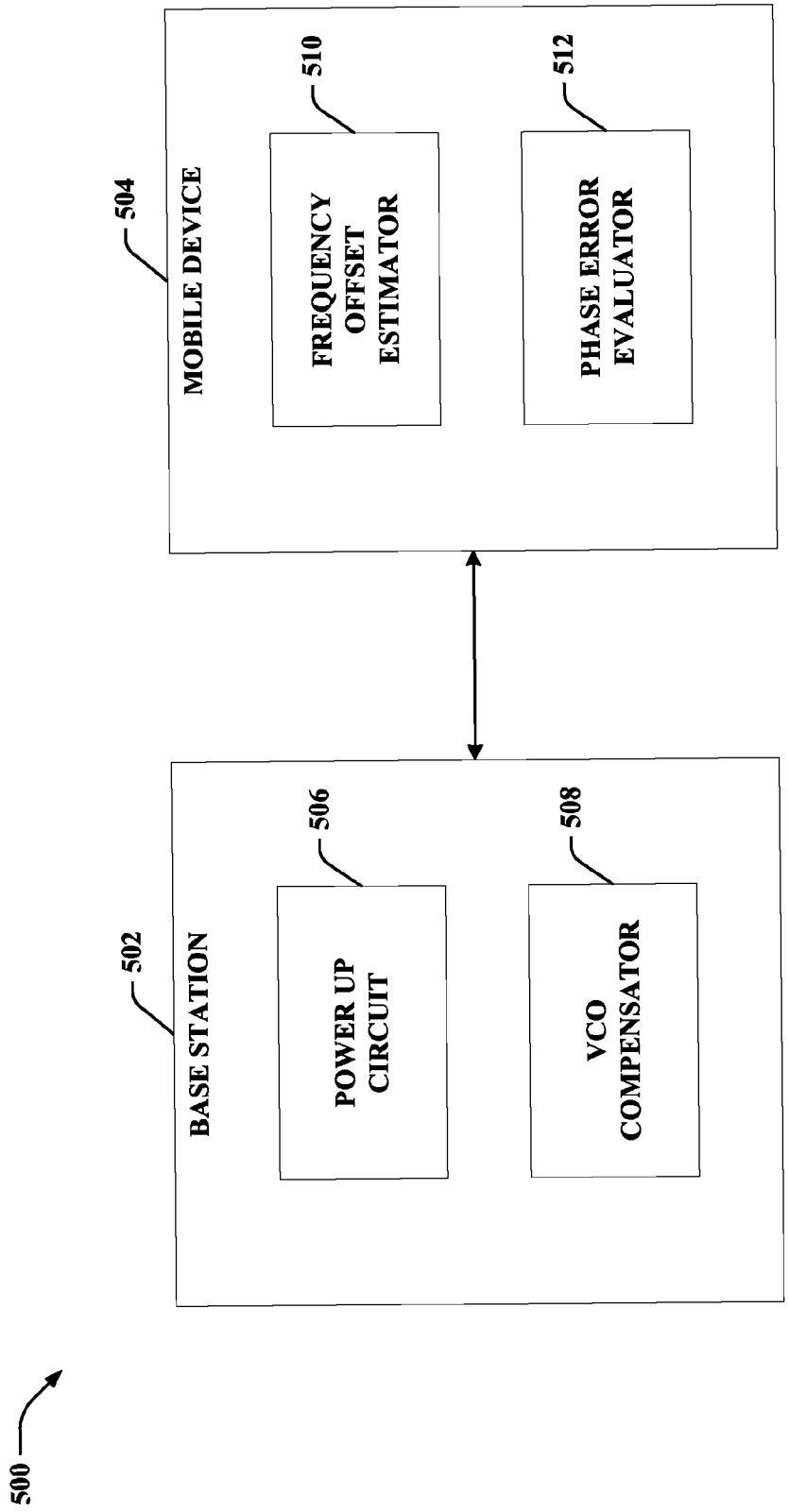
FIG. 5 is an illustration a wireless communications system that mitigates VCO ringing effects on system performance in accordance with an aspect of the subject disclosure.

Referring now to FIG. 5, illustrated is a wireless communications system 500 that effectuates a semi-connected mode of operation. System 500 includes a base station 502 that communicates with a mobile device 504 (and/or any number of disparate mobile devices (not shown)). Base station 502 may transmit information to mobile device 504 over a forward link channel; further base station 502 may receive information from mobile device 504 over a reverse link channel. Moreover, system 500 may be a MIMO system.

Mobile device 504 can include a frequency offset estimator 510 and a phase error evaluator 512. Frequency offset estimator 510 measures frequency offsets between mobile device 504 and base station 502. Frequency offset estimator 510 can makes more than one measurement to account for VCO ringing. Base station 502 can include a transmitter (not shown) that is powered down when packets are transmitting. When the transmitter is turned on in anticipation of transmitting a packet, an initial large current draw results in a ringing effect in the VCO that produces a ringing in the carrier frequency. If the ringing has not settled when a frequency offset estimate is performed, extra error due to the VCO ringing is introduced. This error impacts accuracy of MIMO channel estimates.

Frequency offset estimator 510 makes a second measurement on a preamble field after the ringing has settled. This measurement is employed to determine a frequency offset estimate delta value that represents a difference between an estimate influenced by ringing and an estimate less influenced by ringing. Phase error evaluator 512 utilizes the delta frequency offset estimate to derive a phase error resulting from the ringing effect. The phase error can be employed to correct subsequent OFDM symbols (e.g. a long training field of a packet preamble) to improve accuracy of MIMO channel estimates that rely upon the subsequent symbols.

Base station 502 can include a power up circuit 506 and a VCO compensator 508. Power up circuit 506 can commence turning on the transmitter or portions thereof prior to packet transmission to allow the VCO ringing more time to settle prior to sending the packet over the air. Power up circuit 506 can initialize the transmitter while the packet is processing in the PHY and/or MAC layer. In addition, power up circuit 506 can operate in conjunction with mobile device 504 to mitigate the effects of VCO ringing on performance. Frequency offset estimator 510 can perform a second measurement when the ringing has not settled and power up circuit 506 can operate to ensure that the ringing has settled by the time of the second measurement. VCO compensator 508 may utilize estimates of the VCO ringing effect per transmit configuration. Transmit configuration may include a single transmit antenna, space-time spreading, selective transmit diversity, MIMO and the like. The transmit configuration may determine which portion or portions of the transmitter need to be turned on for transmission. Accordingly, each transmit configuration may generate a different initial current draw resulting in varying voltage drops. Thus, the VCO ringing effect may take various forms depending on the particular transmit configuration employed. VCO compensator 508 may utilize the appropriate estimate to digitally compensate for the ringing effect on the VCO output to produce a more stable carrier frequency.

Figure 6:
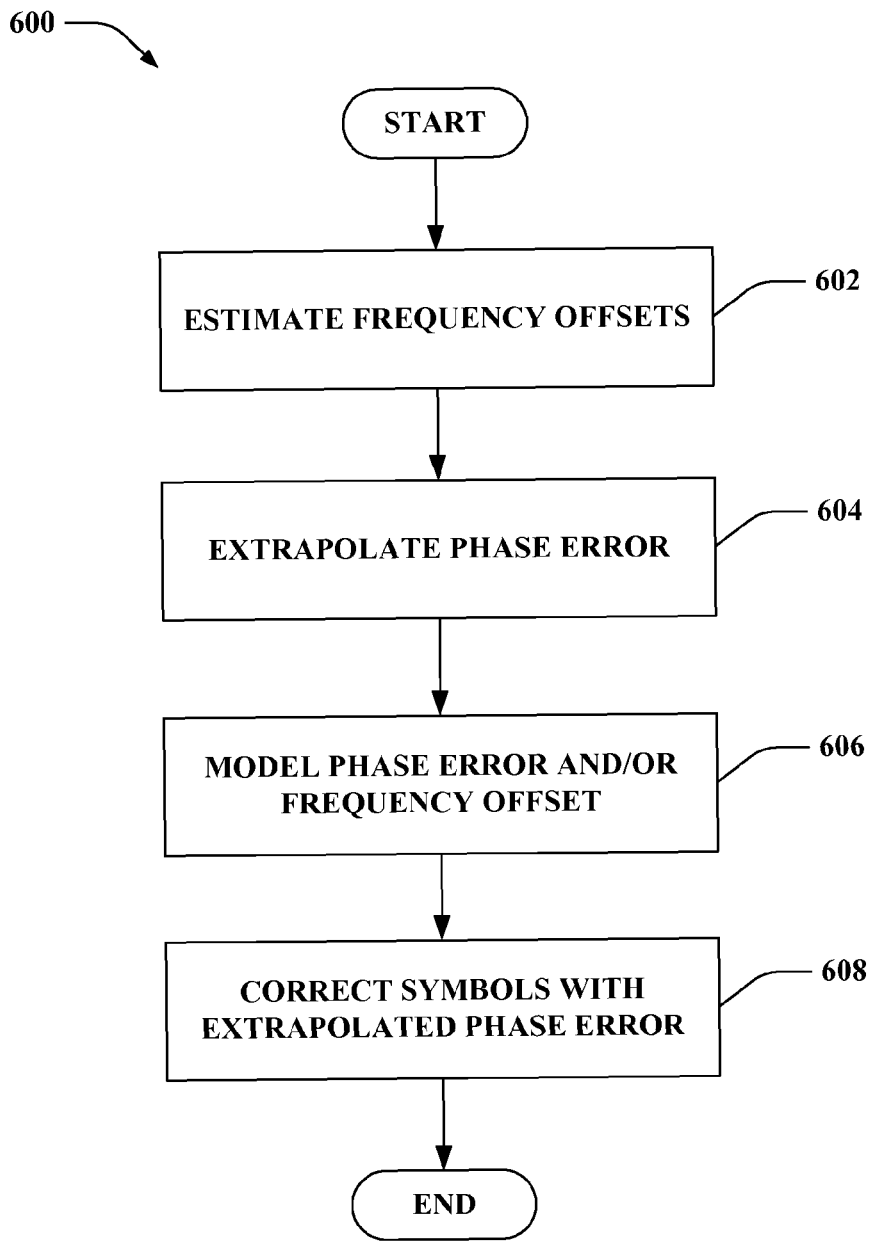
FIG. 6 is an illustration of an example methodology that corrects VCO ringing effects to improve receiver performance.
Figure 7:
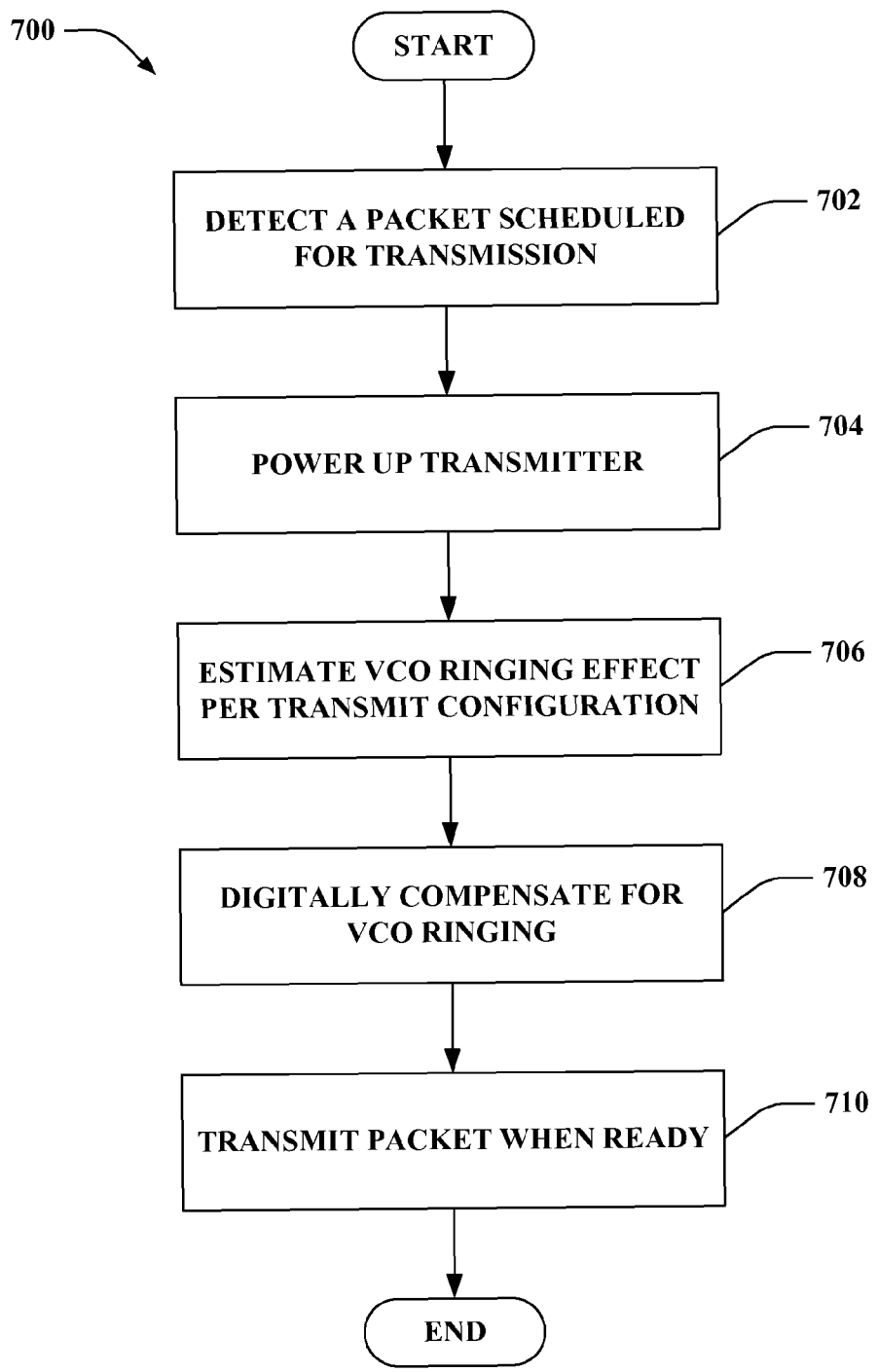
FIG. 7 is an illustration of an example methodology that facilitates mitigating ringing effects of VCO output.

Referring to FIGS. 6 and 7, methodologies relating to reverse link power adjustment based upon broadcasted interference information. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning now to FIG. 6, illustrated is a methodology 600 that facilitates mitigating the effects of VCO ringing on receiver performance in a wireless communications system. Method 600 can be employed, among other things, to improve accuracy of a channel estimate. Method 600 can be implemented on a mobile device in a wireless communications system. At reference numeral 602, at least two frequency offset estimates are obtained. The frequency offset estimates can be obtained, for example, by dividing phase offsets by a corresponding time interval. For example, the phase of pilot tones can be utilized as a phase offset. In addition, blind techniques that do not rely on known training symbols or subcarriers can be employed to get a phase offset. A first frequency offset estimate can be obtained on an early symbol or field of a packet preamble. This first estimate is most affected by VCO ringing. Thus, the second frequency offset estimate can be obtained at a later symbol of the preamble or a data symbol that is typically after ringing has settled. The difference between the first and second frequency estimate represent a delta value that can be utilized to improve performance.

At reference numeral 604, a phase error is extrapolated. The phase error, for example, can be an estimate of a phase offset at a beginning of a subsequent OFDM symbol. The phase error can be obtained by a product of the delta frequency offset estimate and a time period between a SIMO channel estimate and a start of a subsequent symbol. For example, in a Green Field preamble, this time period can be the time between the first two long training fields and the third training field.

At reference numeral 606, a model of phase error or frequency offset can be created. The model represents the change in phase error or frequency offset due to VCO ringing. Multiple frequency offset estimates can be measured to approximate parameters of the model. The approximate parameters provide an estimate of amplitude and decay rate of the VCO ringing based upon the model. Further, the models may include filtering techniques to provide estimated VCO ringing for every symbol.

At reference numeral 608, symbols are corrected with the extrapolated phase error. For example, the symbols can be training symbols such as those in a long training field of a Green Field preamble. The extrapolated phase error can be employed to correct a long training field utilized in MIMO channel estimation. The correction can occur prior to MIMO channel estimation to mitigate the effect of VCO ringing on channel estimation accuracy.

Turning to FIG. 7, illustrated is a methodology 700 that facilitates mitigating VCO ringing. Method 700 can be employed to improve receiver performance by reducing VCO ringing effects received by receivers, among other things. Method 700 can be implemented on a base station in a wireless communications system. At reference numeral 702, it is determined that a packet is scheduled to be transmitted. A packet is typically processed before transmission. For example, the packet is processed by the PHY and MAC layers. The processing can be detected at an early stage. At reference numeral 704, the transmitter or portions thereof are turned on. The power up can occur while the packet is still being processed by the PHY and/or MAC layers to enable ringing to settle prior to actual over the air transmission.

At reference numeral 706, an estimate of VCO ringing effect is made per transmit configuration. Transmit configurations can include a single transmit antenna, space-time spreading, selective transmit diversity, MIMO and the like. The transmit configuration may determine which portion or portions of the transmitter need to be turned on for transmission and, therefore, the nature of the VCO ringing effect. At reference numeral 708, the VCO ringing effect is digitally compensated. For example, the carrier frequency output of the VCO can be processed to account for the ringing particular to a transmit configuration. At reference numeral 708, the packet is transmitted to one or more receivers.

It will be appreciated that, in accordance with one or more aspects described herein, inferences can be made regarding estimating frequency offsets, determining phase offsets, extrapolating phase errors, modeling offsets and errors, determining which symbols to perform frequency offset measurements, determining when to power up a transmitter, compensating for ringing effects, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events.

Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to estimating multiple frequency offsets on various symbols based upon considerations of a VCO ringing effect. By way of further illustration, an inference may be made related to determining which symbols to utilize in measuring frequency offsets. Further, an inference may be made related to correcting symbols based upon frequency offset estimates, extrapolated phase errors, modeled aspects of VCO ringing and the like. It will be appreciated that the foregoing examples are illustrative in nature and are not intended to limit the number of inferences that can be made or the manner in which such inferences are made in conjunction with the various embodiments and/or methods described herein.

Figure 8:
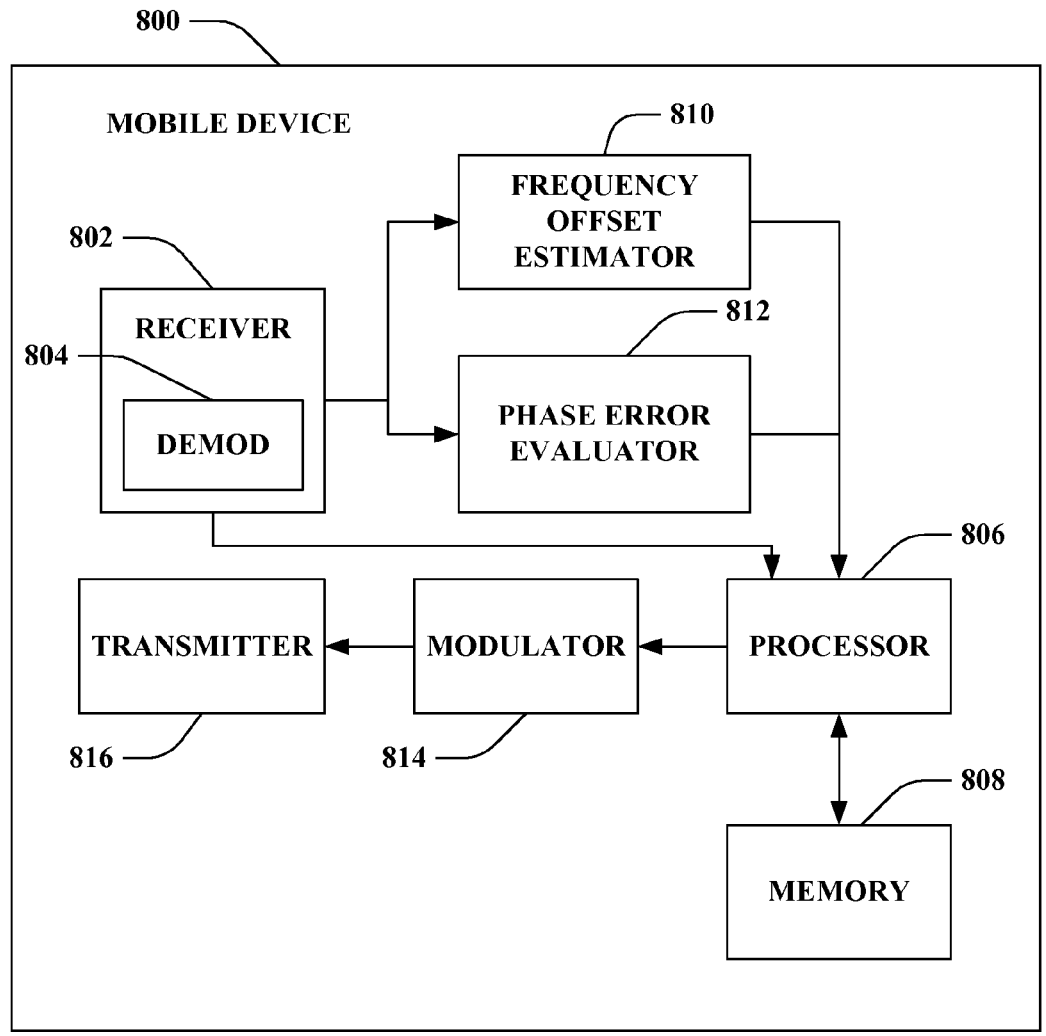
FIG. 8 is an illustration of an example mobile device that facilitates correcting VCO ringing effects.

FIG. 8 is an illustration of a mobile device 800 that facilitates mitigating VCO ringing effects. Mobile device 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that may store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a frequency offset estimator 810 that measures frequency offset between mobile device 800 and a base station. Frequency offset estimator 810 can perform at least two estimates of different fields or symbols of a packet received by receiver 802. The ringing of the carrier frequency can temporarily create additional frequency offset between mobile device 800 and the base station. The second estimate is utilized to reduce estimation error introduce in the first estimate as a result of VCO ringing. Additionally, receiver 802 is coupled to a phase error evaluator that determines a phase error for symbols received by receiver 802 that demodulated and decoded subsequent to the symbols employed for the frequency offset estimates. The phase error can be, for example, extrapolated from a delta value of at least two frequency offset estimates and a time period between a SIMO channel estimate the start of an OFDM symbol to be corrected. The OFDM symbol can include MIMO training symbols such that the impact of VCO ringing on MIMO channel estimation is reduced after correction with the extrapolated phase error. Although depicted as being separate from the processor 806, it is to be appreciated that frequency offset estimator 810, phase error evaluator 812, and/or modulator 814 may be part of processor 806 or a number of processors (not shown).

Figure 9:
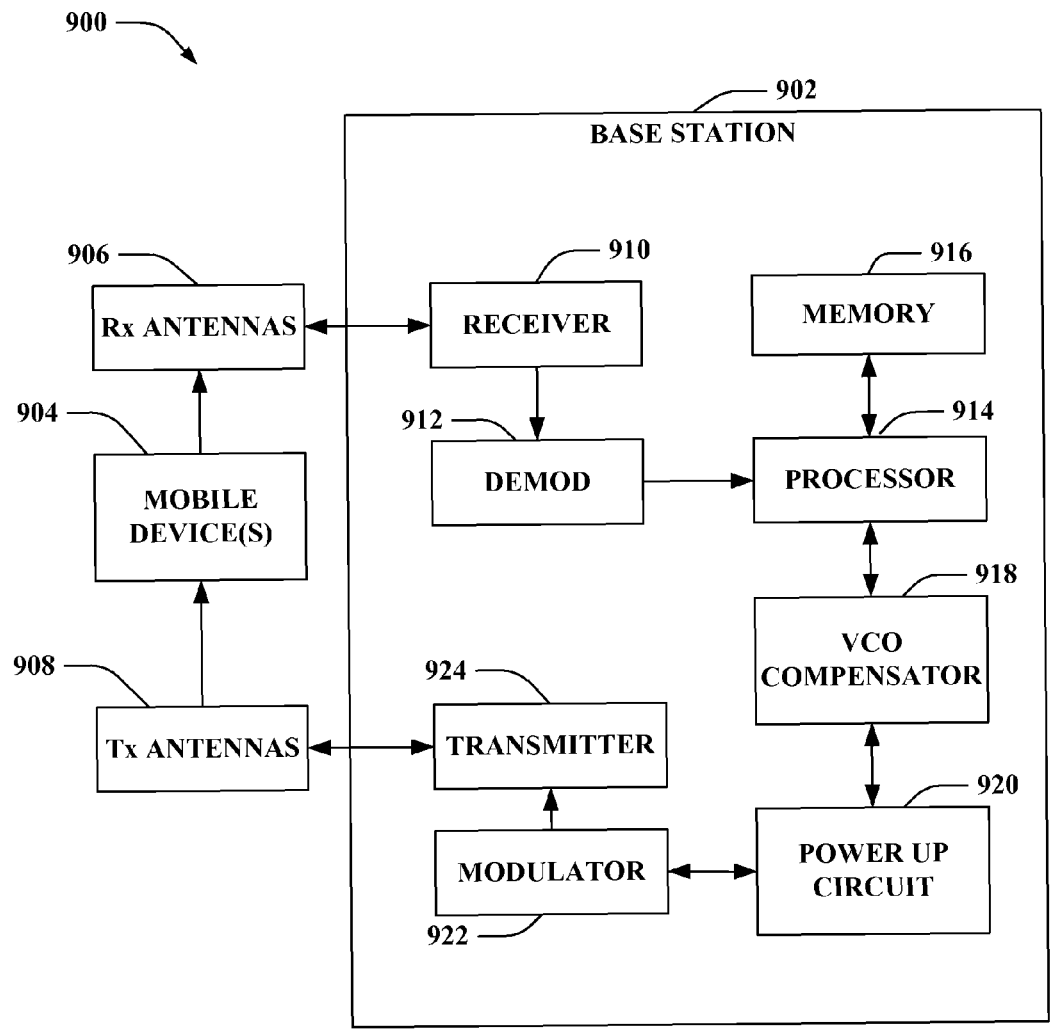
FIG. 9 is an illustration of an example system that facilitates mitigating ringing effects of VCO output.

FIG. 9 is an illustration of a system 900 that facilitates mitigating VCO ringing effects in a wireless communications system. System 900 comprises a base station 902 (e.g., access point, . . . ) with a receiver 910 that receives signal(s) from one or more mobile devices 904 through a plurality of receive antennas 906, and a transmitter 920 that transmits to the one or more mobile devices 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein.

Processor 914 is further coupled to a VCO compensator 918 that corrects ringing effects of the VCO on a carrier frequency. VCO compensator 918 utilizes estimates of the VCO ringing effect per transmit configuration. Transmit configuration may include a single transmit antenna, space-time spreading, selective transmit diversity, MIMO and the like. The transmit configuration may determine which portion or portions of the transmitter need to be turned on for transmission. Accordingly, each transmit configuration may generate a different initial current draw resulting in varying voltage drops. Thus, the VCO ringing effect may take various forms depending on the particular transmit configuration employed. VCO compensator 918 utilizes the appropriate estimate to digitally compensate for the ringing effect on the VCO output to produce a more stable carrier frequency.

Processor 914 is further coupled to a power up circuit 920. Power up circuit 920 can mitigate the VCO ringing effect. Power up circuit 920 may turn on portions of the transmitter 924 as soon as a packet is scheduled to be transmitted. Power up circuit 920 may power on the transmitter ahead of time while the packets are still be processed for transmission. For example, power up circuit 920 can turn on the transmitter while the physical (PHY) layer and/or the media access control (MAC) layer process the packet. As some time is required for the PHY and MAC layers process the packet, the VCO ringing may settle before transmission of the packet over the air commences. Modulator 922 can multiplex the control information for transmission by the transmitter 924 through antenna 908 to mobile device(s) 904. Mobile devices 904 can be similar to mobile device 800 described with reference to FIG. 8. It should be appreciated that other functions can be utilized in accordance with the subject disclosure. For example, a loop back can be configured from transmitter 924 to receiver 902 such that VCO compensator and power up circuit 920 can be employed to estimate and compensate for VCO ringing in transmitter 924 without intervention of mobile devices 904. Although depicted as being separate from the processor 914, it is to be appreciated that VCO compensator 918, power up circuit 920 and/or modulator 922 may be part of processor 914 or a number of processors (not shown).

Figure 10:
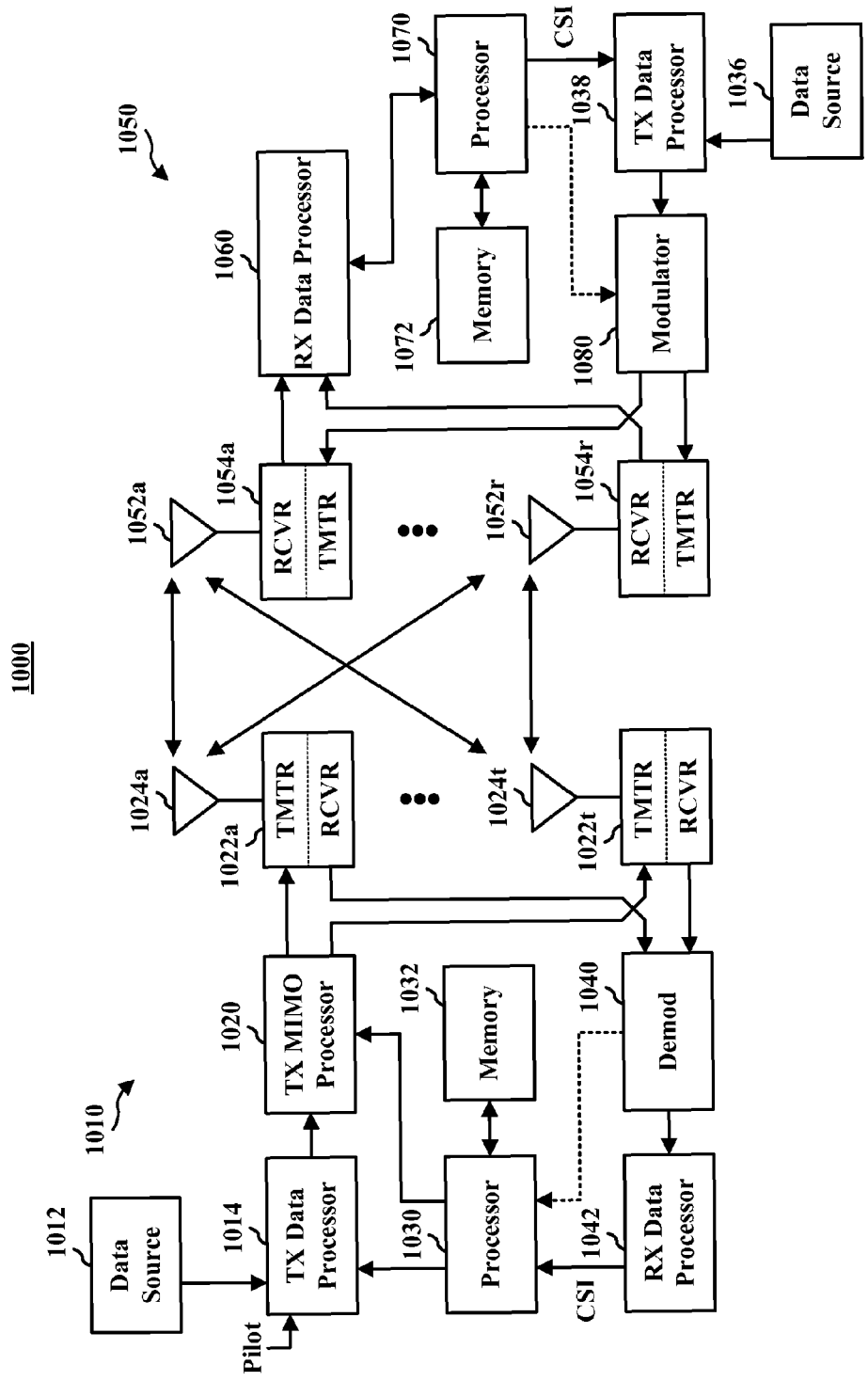
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 may include more than one base station and/or more than one mobile device, wherein additional base stations and/or mobile devices may be substantially similar or different from example base station 1010 and mobile device 1050 described below. In addition, it is to be appreciated that base station 1010 and/or mobile device 1050 may employ the systems (FIGS. 1-3, and 7-8) and/or methods (FIGS. 4-6) described herein to facilitate wireless communication there between.

At base station 1010, traffic data for a number of data streams is provided from a data source 1012 to a transmit (TX) data processor 1014. According to an example, each data stream may be transmitted over a respective antenna. TX data processor 1014 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 1050 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 1030.

The modulation symbols for the data streams may be provided to a TX MIMO processor 1020, which may further process the modulation symbols (e.g., for OFDM). TX MIMO processor 1020 then provides $N_T$ modulation symbol streams to $N_T$ transceivers (TMTR/RCVR) 1022a through 1022t. In various embodiments, TX MIMO processor 1020 applies beamforming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transceiver 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective transceiver (TMTR/RCVR) 1054a through 1054r. Each transceiver 1054 conditions (e.g., filters, amplifies, and downconverts) a respective signal, digitizes the conditioned signal to provide samples, and further processes the samples to provide a corresponding "received" symbol stream.

An RX data processor 1060 may receive and process the $N_R$ received symbol streams from $N_R$ transceivers 1054 based on a particular receiver processing technique to provide $N_T$ "detected" symbol streams. RX data processor 1060 may demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 may periodically determine which precoding matrix to utilize as discussed above. Further, processor 1070 may formulate a reverse link message comprising a matrix index portion and a rank value portion.

The reverse link message may comprise various types of information regarding the communication link and/or the received data stream. The reverse link message may be processed by a TX data processor 1038, which also receives traffic data for a number of data streams from a data source 1036, modulated by a modulator 1080, conditioned by transceivers 1054a through 1054r, and transmitted back to base station 1010.

At base station 1010, the modulated signals from mobile device 1050 are received by antennas 1024, conditioned by transceivers 1022, demodulated by a demodulator 1040, and processed by a RX data processor 1042 to extract the reverse link message transmitted by mobile device 1050. Further, processor 1030 may process the extracted message to determine which precoding matrix to use for determining the beamforming weights.

Processors 1030 and 1070 may direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 11:
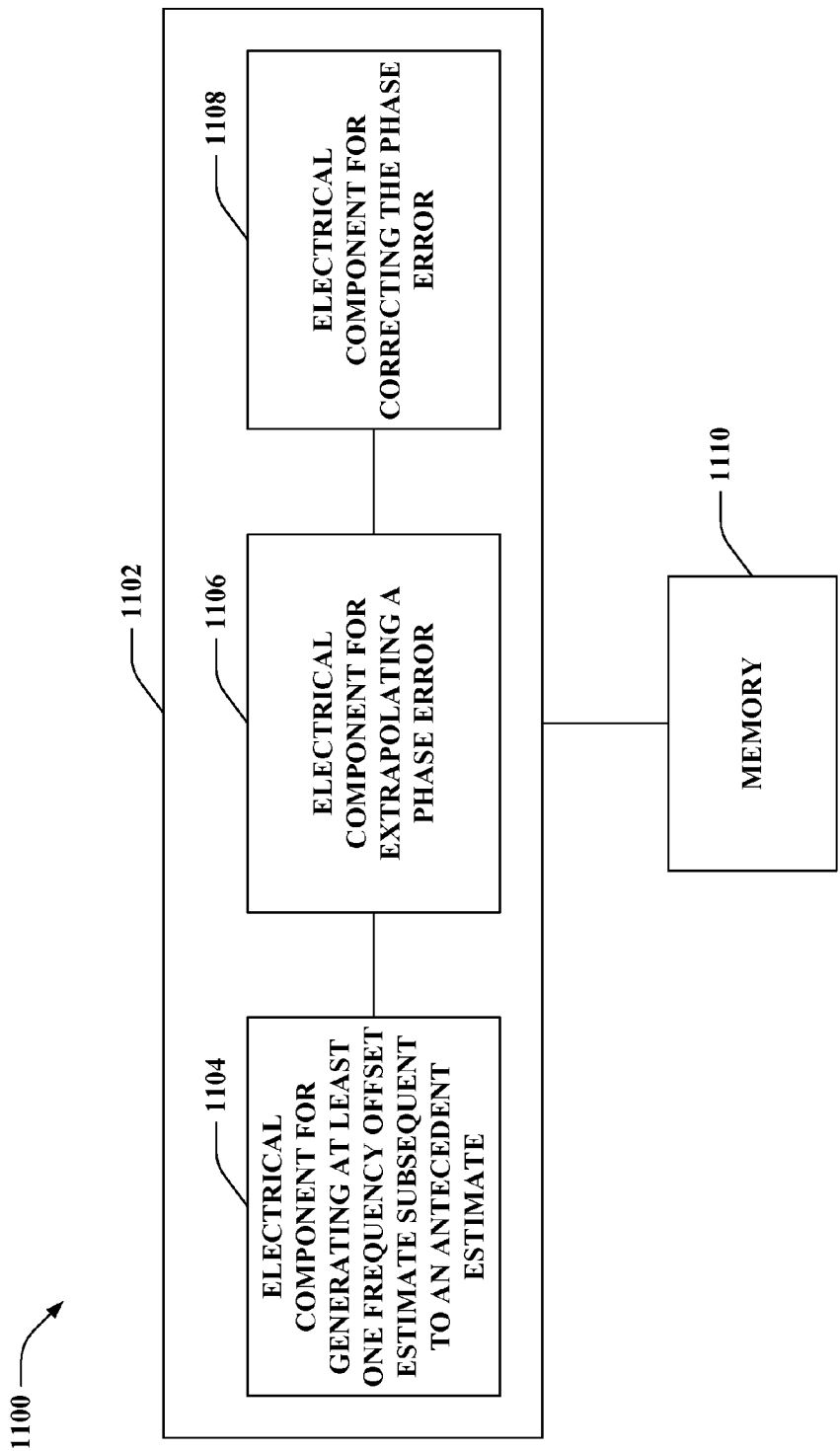
FIG. 11 is an illustration of an example system that facilitates correcting VCO ringing effects.

With reference to FIG. 11, illustrated is a system 1100 that facilitates accounting for received voltage-controlled oscillator ringing effects produced in a transmitter. For example, system 1100 may reside at least partially within a mobile device. It is to be appreciated that system 1100 is represented as including functional blocks, which may be functional blocks that represent functions implemented by a processor, software, or combination thereof (e.g., firmware). System 1100 includes a logical grouping 1102 of electrical components that can act in conjunction. For instance, logical grouping 1102 may include an electrical component for generating at least one frequency offset estimate subsequent to an antecedent estimate 1104. Further, logical grouping 1102 may comprise an electrical component for extrapolating a phase error 1106. For example, the phase error can relate to an estimated phase on a symbol not yet received by system 1100. Moreover, logical grouping 1102 may include an electrical component for correcting the phase error 1108. The correction can occur on the symbol once received but prior to demodulation and decoding. Additionally, system 1100 may include a memory 1110 that retains instructions for executing functions associated with electrical components 1104, 1106, and 1108. While shown as being external to memory 1110, it is to be understood that one or more of electrical components 1104, 1106, and 1108 may exist within memory 1110.

Figure 12:
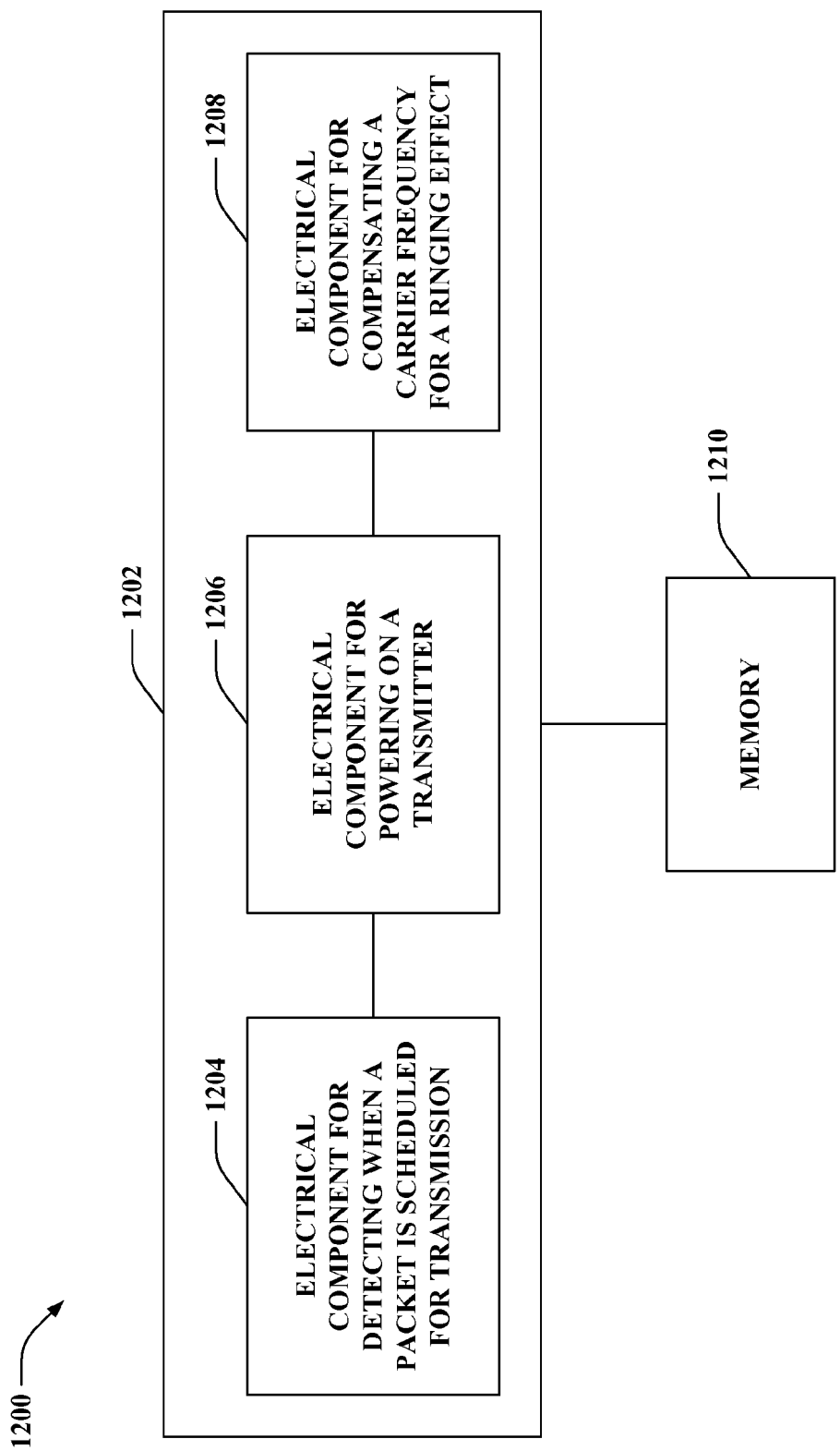
FIG. 12 is an illustration of an example system that facilitates mitigating ringing effects of VCO output.

Turning to FIG. 12, illustrated is a system 1200 that adjusts power on a reverse link. System 1200 may reside within a mobile device, for instance. As depicted, system 1200 includes functional blocks that may represent functions implemented by a processor, software, or combination thereof (e.g., firmware). System 1200 includes a logical grouping 1202 of electrical components that facilitate controlling forward link transmission. Logical grouping 1202 may include an electrical component for detecting when a packet is scheduled for transmission 1204. For example, detection can occur well in advance of the packet being ready for over-the-air transmission. Moreover, logical grouping 1202 may include an electrical component for powering on a transmitter 1206. For example, upon detection of the packet, the transmitter can be powered up to allow the carrier frequency to settle prior to actual transmission of the packet. Further, logical grouping 1202 may comprise an electrical component for compensating the carrier frequency for a ringing effect 1208. For example, a model can be employed to estimate VCO ringing for a particular transmit configuration. The model can be utilized to digital compensate the VCO output to mitigate ringing in the carrier frequency. Additionally, system 1200 may include a memory 1210 that retains instructions for executing functions associated with electrical components 1204, 1206, and 1208. While shown as being external to memory 1210, it is to be understood that electrical components 1204, 1206, and 1208 may exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that accounts for voltage-controlled oscillator ringing effects, comprising:
   receiving a signal from a transmitter;
   obtaining a first frequency offset estimate on the signal, wherein obtaining the first frequency offset estimate comprises utilizing a first portion of the signal where ringing effects are present from a voltage-controller oscillator of the transmitter;
   generating a second frequency offset estimate on the signal utilizing a second portion of the signal that is subsequent to the first portion, wherein the second portion of the signal corresponds to when the ringing effects from the voltage-controller oscillator have settled;
   extrapolating a phase error, introduced through utilization of the first frequency offset estimate, for a third portion of the signal based at least upon a difference between the first frequency offset estimate and the second frequency offset estimate; and
   correcting the phase error for the third portion of the signal.

2. The method of claim 1, wherein extrapolating the phase error further comprising multiplying the difference between the first frequency offset estimate and the second frequency offset estimate by a time value, wherein the time value represents a time period between the first portion of the signal and the third portion of the signal.

3. The method of claim 1, further comprising performing a multiple-input, multiple output (MIMO) channel estimate with the third portion of the signal.

4. The method of claim 1, further comprising performing a single-input, multiple-output (SIMO) channel estimate with the first portion of the signal.

5. The method of claim 1, further comprising:
   acquiring a plurality of frequency offset estimates at a predetermined rate;
   modeling an amplitude and a decay of a ringing of the voltage-controlled oscillator over time based upon the plurality of frequency offset estimates; and
   generating an estimate, based on the plurality of frequency offset estimates, of an input voltage causing a ringing of the voltage-controlled oscillator, wherein
   the extrapolating the phase error further comprises employing the input voltage and an impulse response of a model of the ringing of the voltage-controlled oscillator.

6. The method of claim 5, wherein the modeling the amplitude and the decay of the ringing of the voltage-controlled oscillator comprises utilizing at least one of a curve-fitting technique, an adaptive filtering techniques, or an adaptive estimation technique on the plurality of frequency offset estimates.

7. The method of claim 1, wherein the obtaining the first frequency offset estimate further comprises:

determining an average phase of symbols in the first portion of the signal; and generating the first frequency offset estimate based upon the average phase of symbols in the first portion of the signal and a number of samples corresponding to the first portion of the signal.

8. The method of claim 1, wherein the generating of the second frequency offset estimate further comprises:

determining a phase offset of the second portion of the signal; and determining the second frequency offset estimate based upon the phase offset of the second portion of the signal and a time period between the first portion of the signal and the second portion of the signal.

9. The method of claim 1, wherein the first portion of the signal corresponds to a pilot portion and the second portion of the signal corresponds to a signaling portion.

10. The method of claim 1, further comprising employing the first frequency offset estimate to correct the second portion of the signal prior to the generating of the second frequency offset estimate.

11. A wireless communications apparatus, comprising:

a frequency offset estimator circuit configured to:

generate a first frequency offset estimate from a training portion of a received signal where ringing effects from a voltage-controlled oscillator of a transmitter sending the received signal are present, generate a second frequency offset estimate from a signaling portion of the received signal where the ringing effects have settled, and determine a difference between the first frequency offset estimate and the second frequency offset estimate; and a phase error evaluator circuit configured to estimate a phase error of a symbol of the received signal located after the training portion and the signal portion of the received signal based upon the difference between the first frequency offset estimate and the second frequency offset estimate, wherein the phase error is introduced through utilization of the first frequency offset estimate, which is erroneous due to the ringing effects, to correct later symbols of the received signal.

12. The wireless communications apparatus of claim 11, wherein the frequency offset estimator circuit is further configured to acquire frequency offset estimates from the received signal at a predetermined rate and to model an amplitude and a decay of the ringing effect based upon the frequency offset estimates acquired.

13. A wireless communications apparatus that facilitates mitigating ringing effects, comprising:

means for receiving a signal from a transmitter;

means for generating a first frequency offset estimate from a first portion of the signal where ringing effects from a voltage-controlled oscillator are present;

means for generating a second frequency offset estimate from a second portion of the signal that is subsequent to the first portion, wherein the second portion of the signal corresponds to where ringing effects have settled;

means for extrapolating a phase error for a third portion of the signal based at least upon a difference between of the first frequency offset estimate and the second frequency offset estimate; and means for correcting the phase error for the third portion of the signal.

14. The wireless communications apparatus of claim 13, wherein the signal corresponds to a packet, and the first portion of the signal, the second portion of the signal, and the third portion of the signal correspond to disparate fields of the packet.

15. The wireless communications apparatus of claim 14, wherein the packet is an 802.11 packet.

16. The wireless communications apparatus of claim 15, wherein the 802.11 packet is an 802.11n Greenfield format packet and the second portion of the signal corresponds to a HT-SIG2 field.

17. The wireless communications apparatus of claim 15, wherein the 802.11 packet is an 802.11n mixed format packet and the second portion of the signal corresponds to a HT-SIG1 field.

18. The wireless communications apparatus of claim 13, further comprising means for modeling phase error over time based upon a plurality of frequency offset estimates.

19. A non-transitory computer-readable storage medium comprising computer-executable instructions that, in response to execution by a computing system, cause the computing system to perform operations comprising:

generating a first frequency offset estimate from a first portion of a signal transmitted by a transmitter, wherein the first portion of the signal corresponds to a part of the signal where ringing effects are present from a voltage-controller oscillator of the transmitter;

generating a second frequency offset estimate from a second portion the signal, wherein the second portion of the signal corresponds to another part of the signal where the ringing effects from the voltage-controller oscillator have settled; and extrapolating a phase error for a third portion of the signal, not yet processed, based at least upon a difference between the first frequency offset estimate and the second frequency offset estimate.

20. The non-transitory computer-readable storage medium of claim 19, further comprising computer-executable instructions that cause the computing system to perform operations comprising:

correcting phase error for the third portion of the signal based upon the extrapolation; and performing a multiple-input, multiple output (MIMO) channel estimation based upon the third portion of the signal.

21. The non-transitory computer-readable storage medium of claim 19, further comprising computer-executable instructions that cause the computing system to perform operations comprising:

determining a plurality of frequency offset estimates at a predetermined rate;

modeling an amplitude and a decay of a ringing of the voltage-controlled oscillator over time based upon the plurality of frequency offset estimates; and generating an estimate, based on the plurality of frequency offset estimates, of an input voltage causing a ringing of the voltage-controlled oscillator, wherein the extrapolating of the phase error further comprises employing the input voltage and an impulse response of a model of the ringing of the voltage-controlled oscillator.

22. The non-transitory computer-readable storage medium of claim 19, wherein extrapolating the phase error further comprises multiplying the difference between the first frequency offset estimate and the second frequency offset estimate by a time value, wherein the time value represents a time period between the first portion of the signal and the third portion of the signal.

23. The non-transitory computer-readable storage medium of claim 19, wherein the generating of the first frequency offset estimate further comprises:

determining an average phase of symbols in the first portion of the signal, and generating the first frequency offset estimate based upon the average phase of symbols in the first portion of the signal and a number of samples corresponding to the first portion of the signal; and the generating of the second frequency offset estimate further comprises:

determining a phase offset of the second portion of the signal, and determining the second frequency offset estimate based upon the phase offset of the second portion of the signal and a time period between the first portion of the signal and the second portion of the signal.

\* \* \* \* \*